United States Patent
Weaver

(10) Patent No.: US 8,708,082 B2
(45) Date of Patent: Apr. 29, 2014

(54) TRANSMISSION OIL DELIVERY CONTROL SYSTEM AND METHOD

(75) Inventor: Richard A. Weaver, Brighton, MI (US)

(73) Assignee: GM Global Technology Operations LLC

( * ) Notice: Subject to any disclaimer, the term of this patent is extended or adjusted under 35 U.S.C. 154(b) by 330 days.

(21) Appl. No.: 13/211,776

(22) Filed: Aug. 17, 2011

(65) Prior Publication Data

US 2013/0043086 A1 Feb. 21, 2013

(51) Int. Cl.
*B60K 6/00* (2007.10)

(52) U.S. Cl.
USPC .......... 180/165; 180/65.21; 477/107; 477/78; 701/93; 701/95

(58) Field of Classification Search
USPC ......... 477/181, 109; 701/95, 99, 59; 303/152; 475/129
See application file for complete search history.

(56) References Cited

U.S. PATENT DOCUMENTS

| | | | |
|---|---|---|---|
| 2,899,951 A | | 8/1959 | Olson et al. |
| 3,878,678 A | * | 4/1975 | Huellmantel et al. ...... 60/39.281 |
| 5,119,781 A | | 6/1992 | Trombley et al. |
| 6,929,583 B2 | * | 8/2005 | Ayabe et al. .................. 477/109 |
| 6,931,315 B2 | * | 8/2005 | Ayabe et al. ..................... 701/59 |
| 7,033,297 B2 | * | 4/2006 | Nozaki et al. ................. 475/129 |
| 8,087,733 B2 | * | 1/2012 | Fouquet et al. ............... 303/152 |
| 8,244,446 B2 | * | 8/2012 | Heren et al. ..................... 701/99 |
| 2003/0203790 A1 | * | 10/2003 | Matsubara et al. ........... 477/107 |
| 2004/0106497 A1 | * | 6/2004 | Ayabe et al. .................. 477/107 |
| 2004/0242361 A1 | * | 12/2004 | Nozaki et al. ................. 475/129 |
| 2007/0182245 A1 | * | 8/2007 | DuCharme ................... 303/152 |
| 2007/0213177 A1 | * | 9/2007 | Tamura et al. ................ 477/181 |
| 2008/0306669 A1 | * | 12/2008 | Wang et al. ..................... 701/93 |

* cited by examiner

*Primary Examiner* — John Walters
*Assistant Examiner* — James Triggs

(57) ABSTRACT

A control system for a transmission of a vehicle including an engine includes a deceleration fuel cutoff (DFCO) module and an accumulator module. The DFCO module initiates a DECO period of engine operation. The accumulator module increases a working pressure of a transmission accumulator in response to a start of the DFCO period. A method for controlling a transmission of a vehicle including an engine includes initiating a DECO period of engine operation, and increasing a working pressure of a transmission accumulator in response to a start of the DFCO period.

20 Claims, 6 Drawing Sheets

TRANSMISSION OIL DELIVERY CONTROL SYSTEM AND METHOD

FIELD

The present disclosure relates to control systems and methods for automotive transmissions, and more particularly, to transmission oil delivery control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include a powertrain that generates drive torque used to propel the vehicle. Typically, the powertrain includes an internal combustion engine and a transmission. The engine produces drive torque by combusting an air and fuel (A/F) mixture within cylinders to drive pistons, which rotate a crankshaft. The transmission transmits drive torque produced by the engine at one or more gear ratios to a driveline, which drives one or more wheels of the vehicle. The transmission includes a gear train including one or more gear sets for transferring torque at various gear ratios.

Torque produced by the engine may also be used to power one or more engine peripherals associated with an electrical system and/or a cooling system of the vehicle. For example, engine torque may be used to power an alternator that produces energy for the electrical system and/or a fluid pump that circulates coolant through the engine. During operation, the engine peripherals generate a load on the engine, which may be referred to as a parasitic load.

Powertrain control systems have been developed to control operation of the engine and transmission, including engine torque output and transmission gear ratio. The powertrain control systems control engine torque output by controlling an amount of air flow into the engine and an amount of fuel provided to the cylinders. During periods of vehicle deceleration such as during vehicle braking, the provision of fuel may be halted to conserve fuel during what may be referred to as a deceleration fuel cutoff (DFCO) period. Some powertrain control systems control transmission gear ratio by controlling fluid pressures supplied to hydraulic actuators used to shift between the various gear ratios of the transmission.

SUMMARY

In one form, the present disclosure provides a control system for a transmission of a vehicle including an engine that includes a DFCO module and an accumulator module. The DFCO module initiates a DFCO period of engine operation. The accumulator module increases a working pressure of a transmission accumulator in response to a start of the DFCO period. In one feature, the accumulator module operates a pump used to charge the transmission accumulator in response to the start of the DFCO period. In another feature, the pump is powered via torque supplied by one of the engine and the transmission. In yet another feature, the accumulator module operates an electric motor that powers the pump.

In further features, the accumulator module charges the transmission accumulator by operating a pump when the working pressure is less than a recharge pressure. In a related feature, the accumulator module adjusts the recharge pressure between a first pressure during periods other than the DFCO period to a second pressure greater than the first pressure during the DFCO period. In yet another related feature, the accumulator module increases the recharge pressure based on a measured working pressure at the start of the DFCO period. In yet further features, the accumulator module increases the working pressure while a vehicle brake is applied.

In still further features, the transmission accumulator supplies pressurized fluid to an actuator controlling one of a clutch and a gear synchronizer. In Other features, the transmission is a dual-clutch transmission. In still other features, the transmission accumulator is a hydro-pneumatic accumulator.

In another form, the present disclosure provides a method for controlling a transmission of a vehicle including an engine. The method includes initiating a DFCO period of engine operation, and increasing a working pressure of a transmission accumulator in response to a start of the DFCO period. In one feature, the method further comprises operating a pump used to charge the transmission accumulator in response to the start of the DFCO period. In another feature, the method further comprises powering the pump via torque supplied by one of the engine and the transmission. In yet another feature, the method further comprises operating an electric motor that powers the pump.

In further features, the method further comprises charging the transmission accumulator by operating a pump when the working pressure is less than a recharge pressure, and adjusting the recharge pressure between a first pressure during periods other than the DFCO period to a second pressure greater than the first pressure during the DFCO period. In a related feature, the method further comprises increasing the recharge pressure based on a measured working pressure at the start of the DFCO period. In yet further features, the method further comprises increasing the working pressure while a vehicle brake is applied.

In still further features, the transmission accumulator supplies pressurized fluid to an actuator controlling one of a clutch and a gear synchronizer. In other features, the transmission is a dual-clutch transmission. In still other features, the transmission accumulator is a hydro-pneumatic accumulator.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
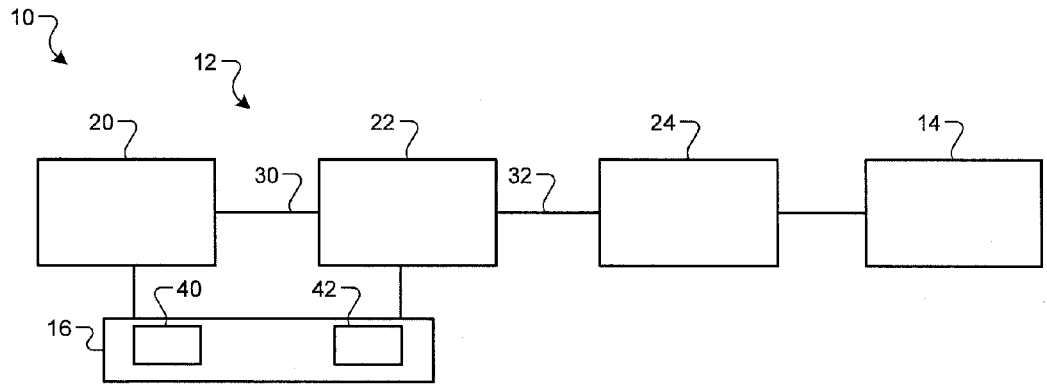
FIG. 1 is a functional block diagram illustrating an exemplary vehicle system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

During vehicle braking, vehicle speed and kinetic energy is reduced through friction by vehicle brakes coupled to the wheels. The brakes slow the vehicle by converting the kinetic energy into heat, which dissipates into the surroundings. Thus, much of the kinetic energy during vehicle braking is wasted as brake heat. DFCO periods are typically initiated during periods when the vehicle brakes are applied and the vehicle is driving the engine through the transmission. The present disclosure provides a control system and method that can reduce the amount of energy wasted during DFCO periods as brake heat. The control system and method convert kinetic energy that may otherwise be wasted into potential energy in a transmission accumulator that stores pressurized fluid used to operate the transmission.

The control system and method control a working pressure of a transmission accumulator by controlling operation of a transmission pump that pressurizes (i.e., charges) the transmission accumulator. During periods when DFCO is not performed, the transmission pump is operated so that the working pressure is greater than a first recharge pressure. During periods when DFCO is performed, the transmission pump is operated so that the working pressure is greater than a second recharge pressure greater than the first recharge pressure. In engine systems where the engine powers the transmission pump, operation of the transmission pump during DFCO periods when the engine is driven by the vehicle reduces the need to operate the transmission pump during periods when engine torque output powers the transmission pump directly or indirectly. In this way, the control system and method of the present disclosure can reduce parasitic loads on the engine and thereby increase vehicle performance and fuel economy.

With particular reference to FIG. 1, a functional block diagram illustrates an exemplary vehicle system 10 according to the present disclosure. The vehicle system 10 includes a powertrain system 12 that drives one or more wheels 14 of the vehicle, and an electrical system 16. The powertrain system 12 includes an engine system 20, a transmission system 22, and a driveline 24. The engine system 20 produces drive torque that is transmitted to the transmission system 22. The transmission system 22 receives drive torque output by the engine system 20 via an input shaft 30 and transfers the drive torque to the driveline 24 via an output shaft 32 at one of multiple gear ratios. A gear ratio (or drive ratio) may be defined as a ratio of a first rotational speed of the input shaft 30, or input shaft speed, to a second rotational speed of the output shaft 32, or output shaft speed. The driveline 24 couples the transmission system 22 to the wheels 14. The present disclosure is not limited to powertrains of a particular layout or drivelines of a particular type. For example, the powertrain system may have a front-wheel-drive layout, a rear-wheel-drive layout, or an all-wheel drive layout.

The electrical system 16 supplies energy to the powertrain system 12 and other systems of the vehicle. The electrical system 16 includes a battery 40 and a generator or alternator 42. The battery 40 stores energy that powers various components of the vehicle. The alternator 42 produces energy that charges the battery and also powers various components of the vehicle in combination with the battery energy. The alternator 42 is rotationally driven by the engine system 20 as discussed in more detail below. The alternator 42 generates a load on the engine that is proportional to an amount of energy generated by the alternator, which is based on electrical consumption.

Figure 2:
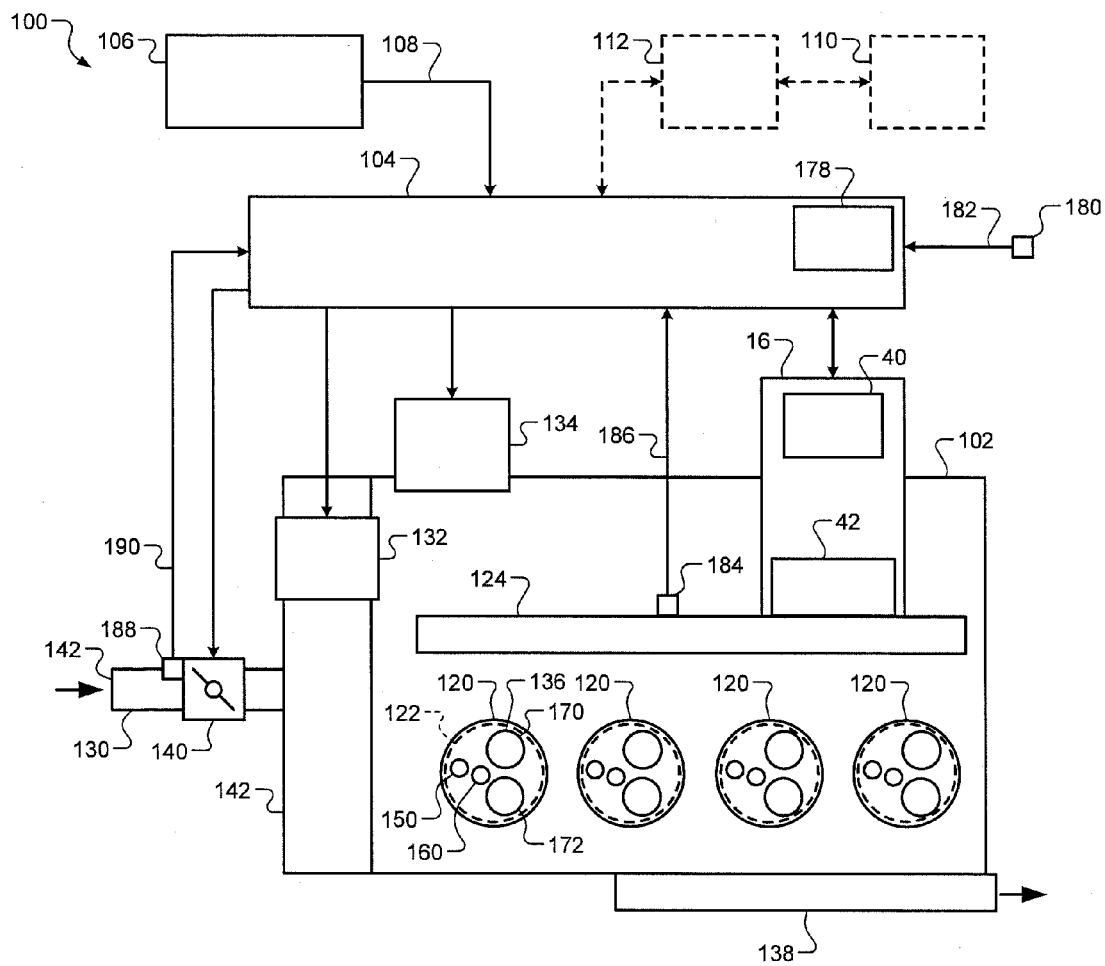
FIG. 2 is a functional block diagram illustrating an exemplary engine system in an engine control system according to the present disclosure.

With particular reference to FIG. 2, a functional block diagram illustrates an exemplary implementation of the engine system 20 in an engine control system 100 according to the present disclosure. The engine system 20 includes an internal combustion engine (ICE) 102 controlled by an engine control module (ECM) 104 in cooperation with the transmission system 22 based on various driver inputs, vehicle operating conditions, and other vehicle system signals. The driver inputs are received by driver interface devices 106 that generate driver signals 108 in response to the driver inputs. The driver interface devices 106 include, for example, an accelerator pedal and a brake pedal manipulated by the driver. Various engine operating conditions and parameters are measured by one or more sensors and/or determined by one or more modules as discussed in further detail below. The vehicle system signals include signals generated by the various components of the vehicle system 10. In various implementations, the engine system 20 may be a hybrid engine system including an electric motor 110 controlled by a hybrid control module 112 in cooperation with the ECM 104. The electric motor 110 produces torque used alone or in combination with torque produced by the ICE 102 to propel the vehicle.

The ICE 102 produces drive torque by combusting an A/F mixture and may be one of several types. For example, the ICE 102 may be a spark-ignition (SI) engine or a compression-ignition (CI) engine. The ICE 102 may have a V-type configuration or an in-line configuration. For exemplary purposes, the ICE 102 is presented as a reciprocating SI engine including four cylinders 120 in an in-line configuration. Pistons 122 reciprocate within the cylinders 120 and drive rotation of a crankshaft 124. While four cylinders 120 are presented, it will be appreciated that the ICE 102 may have fewer or additional cylinders. The crankshaft 124 is coupled to the input shaft 30. The crankshaft 124 is further coupled to and drives the alternator 42. The crankshaft 124 may drive the alternator 42 via a belt and pulley arrangement (not shown).

The ICE 102 includes an intake system 130, a fuel system 132, an ignition system 134, a valvetrain 136, and an exhaust system 138. The intake system 130 controls a mass air flow (MAF) of air entering the ICE 102 and distributes the air to the cylinders 120. The intake system 130 may include a throttle 140 that controls MAF and an intake manifold 142 that distributes the air to the cylinders 120. The fuel system 132 supplies fuel to the ICE 102. The fuel system 132 may include a fuel tank assembly (not shown) that supplies the fuel under pressure to one or more fuel injectors (not shown) that control an amount of fuel supplied to the ICE 102. In various implementations, such as central point injection and multi-point injection implementations, the fuel injectors may inject fuel into the intake system 130 upstream of the cylinders 120. In alternate direct-injection implementations, the fuel injectors may inject fuel directly into the cylinders 120. For exemplary purposes, the ICE 102 is presented as having a direct-injection system including fuel injectors 150 extending within the cylinders 120.

The ignition system 134 supplies energy that initiates combustion within the cylinders 120 in the form of a spark. The ignition system 136 includes one or more spark plugs 160 extending within the cylinders 120 that supply the spark. In alternate implementations, the spark plugs 160 may be omitted and combustion may be initiated by compression of the A/F mixtures. The valvetrain 136 controls the flow of air into the cylinders 120 and exhaust out of the cylinders 120. The valvetrain 136 includes intake valves 170 and exhaust valves 172. One or more intake valves 170 and exhaust valves 172 may be provided for each of the cylinders 120.

The intake valves 170 are moveable between closed positions and open positions. In the closed positions, the intake valves 170 close the cylinders 120 to the intake system 130 and thereby inhibit fluid communication there between. In the open positions, the intake valves 170 open the cylinders 120 to the intake system 130 and thereby enable fluid communication there between. The exhaust valves 172 are moveable between closed positions and open positions. In the closed positions, the exhaust valves 172 close the cylinders 120 to the exhaust system 138 and thereby inhibit fluid communication there between. In the open positions, the exhaust valves 172 open the cylinders 120 to the exhaust system 138 and thereby enable fluid communication there between.

During operating of the ICE 102, intake air is drawn into the cylinders 120 through the throttle 140 and the intake manifold 142 by the pistons 122 and mixes with fuel supplied by the fuel injectors 150. The A/F mixtures are compressed by the pistons 122 and subsequently ignited by the spark provided by the spark plugs 160. Combustion of the A/F mixtures drives the pistons 122, which in turn drive the crankshaft 124 and thereby produce the drive torque. Exhaust produced by the combustion is forced out of the cylinders 120 by the pistons 122 into the exhaust system 138. The exhaust system 138 receives exhaust from the cylinders 120 and treats the exhaust before expelling the exhaust into the surroundings.

The ECM 104 communicates with the electrical system 16 and controls operation of the ICE 102 by controlling various engine operating parameters including, but not limited to engine MAF, fueling rate, A/F ratio, and spark timing. The ECM 104 controls operation by controlling various components of the intake system 130, the fuel system 132, and the ignition system 134, and the valvetrain including the throttle 140, the fuel injectors 150, the spark plugs 160, and the intake and exhaust valves 170, 172.

According to the present disclosure, the ECM 104 is part of a DFCO system that halts the provision of fuel when predetermined conditions for DFCO are met. The ECM 104 includes a DFCO control module 178 that begins a DFCO period when the DFCO conditions are met and ends the DFCO period when the DFCO conditions cease to be met. Generally, the DFCO conditions will be met when the vehicle is decelerating and the vehicle is driving the ICE 102 through the transmission system. The DFCO conditions will cease to be met when torque output by the ICE 102 is desired to accelerate the vehicle and/or power engine peripherals.

The present disclosure is not limited to a particular set of DFCO conditions, and various DFCO conditions can be predetermined to ensure a suitable transition between DFCO periods and periods when the ICE 102 is producing torque. In an exemplary implementation, the DFCO module 178 initiates DFCO periods when the following DFCO conditions are met: (1) a vehicle deceleration is greater than a predetermined deceleration, (2) a vehicle speed is greater than a predetermined vehicle speed, (3) an engine speed is greater than a predetermined engine speed, (4) a throttle position is less than a predetermined position, and (5) the ICE 102 is being driven by the vehicle through the transmission system 22. The DFCO module ends the DFCO period when one or more of the DFCO conditions is no longer met. The DFCO module 178 informs the transmission system 22 when a DFCO period is initiated and ended, as discussed in more detail below.

The engine control system 100 measures various operating parameters used by the ECM 104 to determine the vehicle acceleration, the vehicle speed, the engine speed, and the throttle position via sensors. One or more wheel speed sensors 180 coupled to the wheels 14 measure rotational speeds of the wheels 14, or wheel speeds, and output signals 182 indicative of the measured wheel speeds. The ECM 104 receives the signals 182 and determines the vehicle speed based on the measured wheel speeds. The ECM 104 determines the vehicle acceleration by determining a time rate of change in the vehicle speed. An engine speed sensor 184 senses a rotational speed of the crankshaft 124, or crankshaft speed, and outputs a signal 186 indicative of the measured crankshaft speed. The ECM 104 receives the signal 186 and determines the engine speed based on the measured crankshaft speed. A throttle position sensor 188 measures the throttle position by measuring a rotational position of the blade of the throttle 140, and outputs a signal 190 indicative of the measured throttle position. The ECM 104 receives the signal 190 and determines the throttle position based on the measured throttle position. The ECM 104 further communicates with the transmission system 22 to determine whether the transmission system 22 is operating in a drive gear, and therefore is driving the ICE 102, or is operating in a neutral gear and is not driving the ICE 102.

Figure 3:
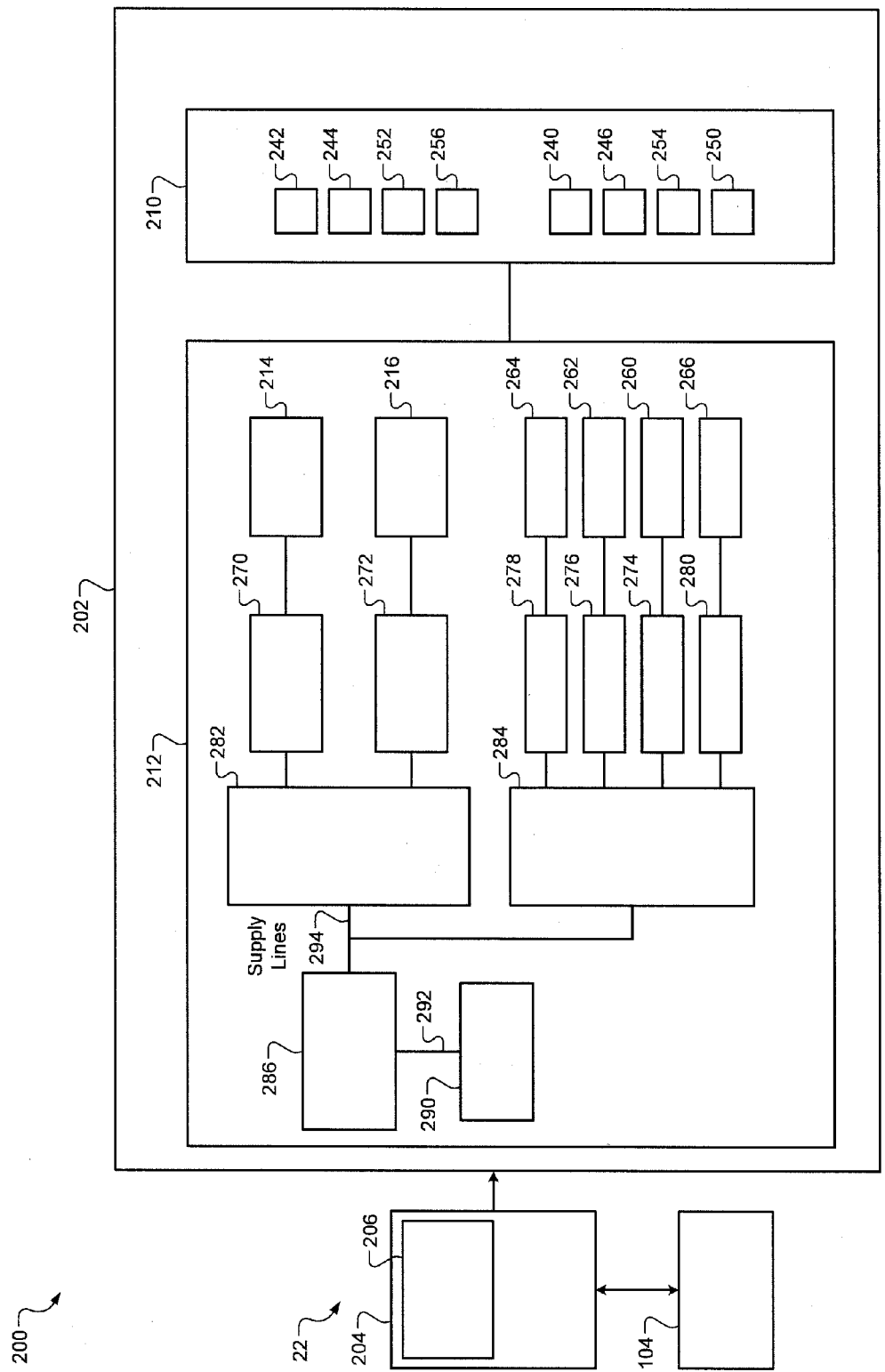
FIG. 3 is a functional block diagram illustrating an exemplary transmission system in a transmission control system according to the present disclosure.

With particular reference to FIG. 3, a functional block diagram illustrates an exemplary implementation of the transmission system 22 in a transmission control system 200 according to the present disclosure. The transmission system 22 includes a transmission 202 controlled by a transmission control module (TCM) 204 in cooperation with the ECM 104 based on various driver inputs, vehicle operating conditions, and vehicle system signals. The TCM 204 includes a pump control module 206 that implements control according to the present disclosure. Generally, the transmission 22 may be of the automatic or semi-automatic type and includes a gear train 210 and a hydraulic actuation system 212. The gear train 210 includes a system of gear sets that transfer torque between the input shaft 30 and the output shaft 32 at the various gear ratios. Each gear set is selectively engageable to transfer torque at one of the gear ratios. The hydraulic actuation system 212 is controlled by the TCM 204 and is operable to engage and disengage the gear sets and thereby shift the transmission 202 between the various gear ratios.

According to the present disclosure, the transmission 202 is not limited to a particular automatic or semi-automatic configuration. For exemplary purposes, the transmission 202 presented is a seven-speed dual clutch transmission providing seven forward gear ratios, one reverse gear ratio, and a neutral condition. The transmission 202 transfers the torque through a first (C1) clutch 214 and a second (C2) clutch 216. The C1 and C2 clutches 214, 216 are dry clutches biased in a disengaged position and moved between the disengaged position and an engaged position (i.e., actuated) using pressurized fluid within the hydraulic actuation system 212.

Figure 4:
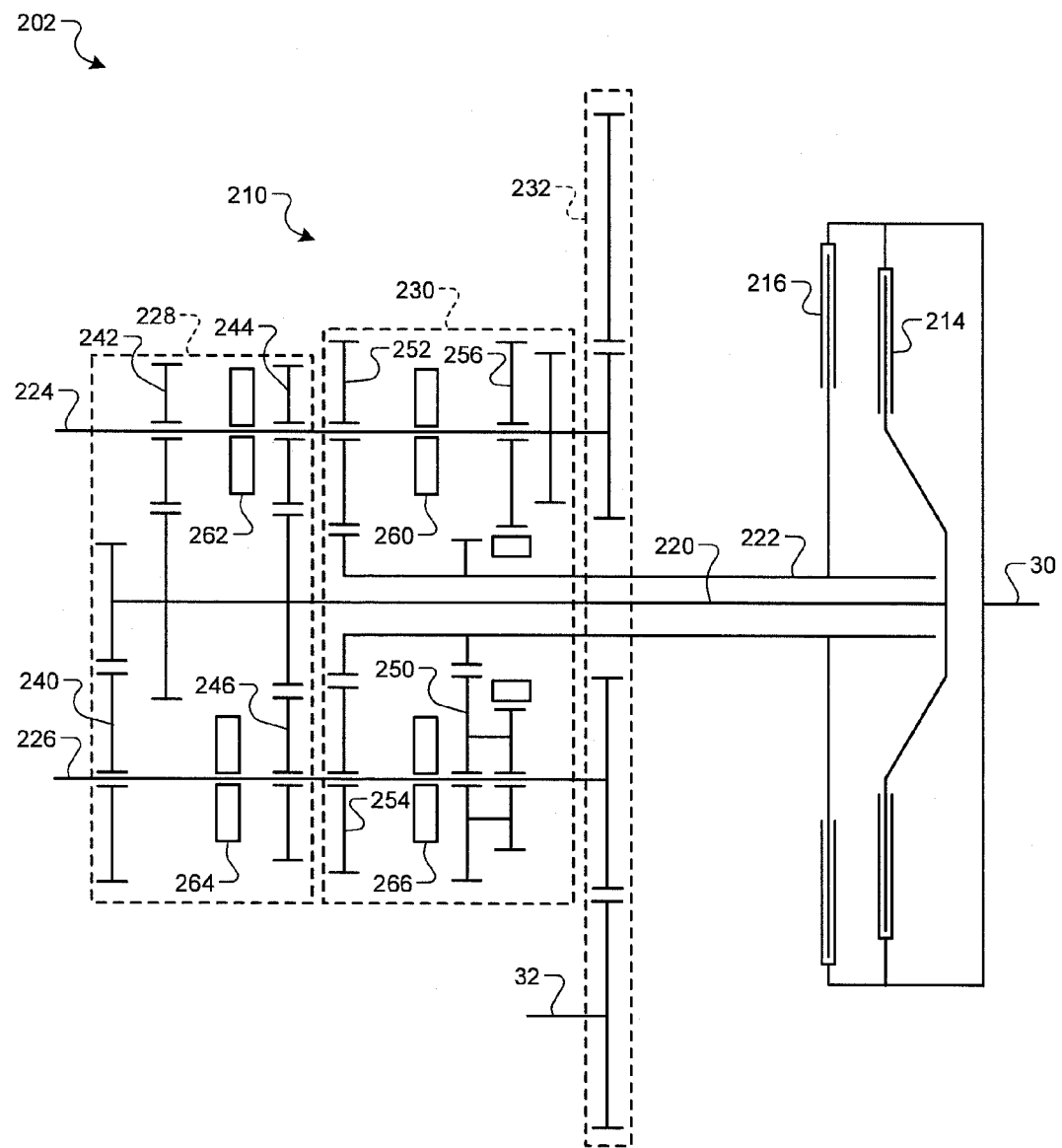
FIG. 4 is a schematic diagram illustrating an exemplary gear train of a transmission according to the present disclosure.

With additional reference to FIG. 4, an exemplary implementation of the gear train 210 is illustrated in a schematic diagram. The gear train 210 includes a first intermediate input shaft 220, a second intermediate input shaft 222, a first counter shaft 224, a second counter shaft 226, and gear sets 228, 230, 232. The first intermediate input shaft 220 and the second intermediate input shaft 222 are coupled to the input shaft 30 via the C1 clutch 214 and the C2 clutch 216, respectively. The first intermediate input shaft 220 may be supported for rotation within the second intermediate input shaft 222 about a common axis of rotation. The first and second counter shafts 224, 226 are radially offset from and extend parallel to the first and second intermediate input shafts 220, 222.

The gear sets 228, 230, 232 each include pairs of helical input gears and output gears, which may also be referred to as a gear set. When engaged, each of the input and output gear sets provides a unique gear ratio at which torque may be transmitted from one of the first and second intermediate input shafts 220, 222 to one of the first and second counter shafts 224, 226. The gear set 228 includes input gears fixed for rotation with the first intermediate input shaft 220 and output gears fixed for rotation with the first and second counter shafts 224, 226, as shown. The gear set 228 includes odd gear sets 240, 242, 244, 246 providing gear ratios corresponding to a first gear, a third gear, a fifth gear, and a seventh gear, respectively. The gear set 230 includes input gears fixed for rotation with the second intermediate input shaft 222 and output gears fixed for rotation with the first and second counter shafts 224, 226, as shown. The gear set 230 includes even gear sets 250, 252, 254 providing gear ratios corresponding to a second gear, a fourth gear, and a sixth gear, respectively. The gear set 230 further includes a reverse gear set 256 providing a reverse gear. The gear set 232 includes input gears fixed for rotation with the first and second counter shafts 224, 226 and an output gear fixed for rotation with the output shaft 32. In various arrangements, the input and output gears of the gear set 232 may include a planetary gear set.

A first (A4R) synchronizer 260 and a second (A53) synchronizer 262 are disposed on and axially moveable along the first counter shaft 224. The A4R synchronizer 260 is disposed between the even gear set 252 and the reverse gear set 256 and is selectively engaged with the even gear set 252 and the reverse gear set 256 by the hydraulic actuation system 212 to shift into and out of the fourth and reverse gears, respectively. The A53 synchronizer 262 is disposed between the odd gear sets 242 and 244 and is selectively engaged with the odd gear sets 242 and 244 by the hydraulic actuation system 212 to shift into and out of the fifth and third gears, respectively.

A third (A17) synchronizer 264 and a fourth (A26) synchronizer 266 are disposed on and axially moveable along the second countershaft 226. The A17 synchronizer 264 is disposed between the odd gear sets 240 and 246 and is selectively engaged with the odd gear sets 240 and 246 by the hydraulic actuation system 212 to shift into and out of the first and seventh gears. The A26 synchronizer is disposed between the even gear sets 250 and 254 and is selectively engaged with the even gear sets 250 and 254 by the hydraulic actuation system 212 to shift into and out of the second gear and the sixth gear.

With particular reference to FIG. 3, the hydraulic actuation system 212 includes the C1 and C2 clutches 214, 216, the A4R, A53, A17, A26 synchronizers 260, 262, 264, 266, and associated piston-type hydraulic actuators. A first (C1) clutch actuator 270 and a second (C2) clutch actuator 270 move the C1 clutch 214 and the C2 clutch 216, respectively, between their disengaged and engaged positions. A first (A4R) synchronizer actuator 274 and a second (A53) synchronizer actuator 276 engage and disengage the gear sets 252 and 256 and the gear sets 242 and 244, respectively. A third (A17) synchronizer actuator 278 and a fourth (A26) synchronizer actuator 280 engage and disengage the gear sets 240, 246 and the gear sets 250, 254, respectively.

The hydraulic actuation system 212 further includes a clutch control subsystem 282, a gear selection subsystem 284, and an oil delivery subsystem 286. The clutch control subsystem 282 controls the pressures and the flow rates of pressurized fluid supplied to the C1 and C2 clutch actuators 270 and 272, respectively, and thereby controls operation of the C1 and C2 clutches 214 and 216. The clutch control subsystem 282 includes circuits in communication with the C1 and C2 clutches 214 and 216 and various fluid control devices including pressure control solenoids, flow control solenoids, and micro air bleeds. The gear selection subsystem 284 controls the pressures and the flow rates of pressurized fluid supplied to the A4R, A53, A17, A26 actuators 274, 276, 278, 280 and thereby controls operation of the A4R, A53, A17, A26 synchronizers 260, 262, 264, 266. The gear selection subsystem 284 includes circuits in communication with the A4R, A53, A17, A26 actuators 274, 276, 278, 280 and various fluid control devices including pressure control solenoids, flow control solenoids, and control valves.

Figure 5:
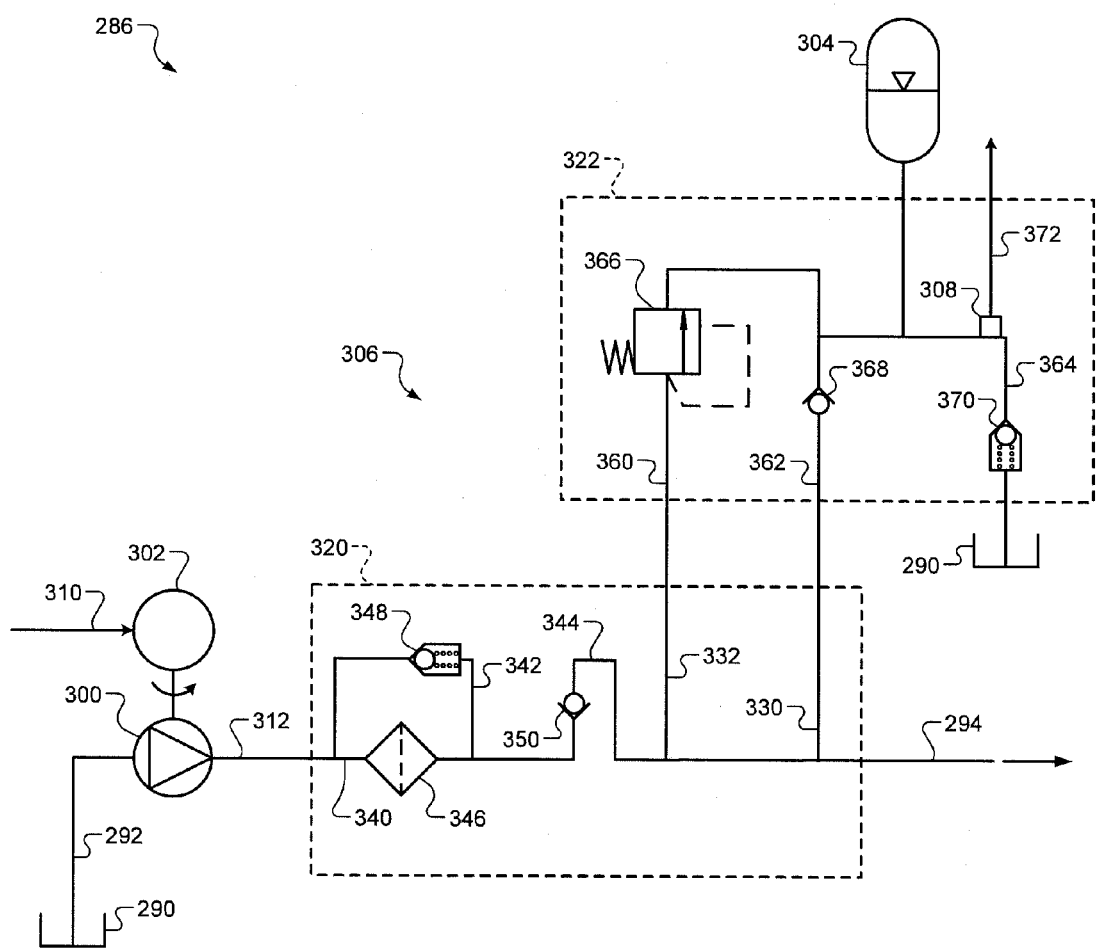
FIG. 5 is a schematic diagram illustrating an exemplary oil delivery system according to the present disclosure.

The oil delivery subsystem 286 draws fluid from a sump 290 via an intake line 292 and supplies the fluid to the clutch control subsystem 282 and the gear selection subsystem 284 at a desired supply pressure via supply lines 294. With additional reference to FIG. 5, a schematic diagram illustrates an exemplary implementation of the oil delivery subsystem 286 according to the present disclosure. The oil delivery subsystem 286 includes a pump 300, a motor 302, an accumulator 304, hydraulic circuitry 306, and a pressure sensor 308.

The pump 300 draws fluid from the sump 290 and supplies the fluid under pressure to an outlet line 312. The motor 302 drives the pump 300 and receives power from the electrical system 16 via a signal 310. In alternate implementations, the pump 300 may be powered by another prime mover or mechanism that receives energy from the ICE 102 and/or the transmission 202. For example, the pump 300 may be rotationally driven or powered by a rotating member of the ICE 102, such as the crankshaft 124, or a rotating member of the transmission 202, such as the input shaft 30.

The accumulator 304 stores fluid under pressure and is charged by the pump 300. In various aspects, the accumulator 304 can perform a variety of functions including maintaining system pressure, developing system flow, and absorbing system shock. The accumulator 304 can be one of several types including, weight-loaded, spring-loaded, and hydro-pneumatic. For exemplary purposes, the accumulator 304 is presented as a nitrogen-charged hydro-pneumatic type accumulator.

The accumulator 304 has a reserve volume (Vres) and a working volume (Vwork). The reserve volume Vres is a volume reserved for a worst case shift maneuver and ensures adequate system pressure and flow when the demand exceeds a capability of the pump 300 during the maneuver. The reserve volume Vres is equal to a difference between a first volume (V3) at a recharge pressure (P3) and a second volume (V2) at a minimum system pressure (P2). The recharge pressure P3 is a pressure at which the pump 300 is operated to recharge the accumulator 304. The minimum system pressure P2 is a pressure required by the C1 and C2 clutches 214, 216 when operated at a full clutch capacity (i.e., full torque). The accumulator 304 further has a volume (V1) at a pre-charge pressure (P1), which is a pressure required to get initial accumulator piston movement. The working volume Vwork is equal to a difference between a first volume (V4) at a maximum system pressure (P4) and the volume V3 at the recharge pressure P3. The maximum system pressure P4 is a pressure at which operation of the pump 300 is discontinued when recharging the accumulator 304.

Generally, the volume V1, the volume V2, the volume V3, and the volume V4 satisfy the relationship: V1>V2>V3>V4. Additionally, the pre-charge pressure P1, the minimum system pressure P2, the recharge-pressure P3, and the maximum system pressure P4 satisfy the following relationship: P1<P2<P3<P4. The volumes V1, V2, V3, V4 and the pressures P1, P2, P3, P4 can be predetermined for a particular transmission during a development phase of transmission design. For purposes of the present example, the pre-charge pressure P1 may be around twenty-nine bars (29 bar), the minimum system pressure P2 may be around thirty-seven bars (37 bar), and the maximum charge pressure may be around sixty-three bars (63 bar).

According to the present disclosure, the recharge pressure P3 may be different during DFCO periods than during other periods. For purposes of the present example, a first recharge pressure (P3A) during periods other than DFCO periods may be around forty-one bars (41 bar). A second recharge pressure (P3B) during DFCO periods is greater than the recharge pressure P3A, and may be predetermined to achieve a desired recharge cycle time and/or a desired duty cycle of the motor 302 during the DFCO periods. The recharge pressure P3B may be predetermined based on a desired deceleration rate through an increased duty cycle and/or load of the motor 302. In various implementations, the recharge pressure P3B may be set to a pressure greater than the measured working pressure WPmeas at a start of a DFCO period to ensure that the working pressure at an end of the DFCO period is greater than that at the start. For purposes of the present example, the recharge pressure P3B may be between around forty-three bars (43 bar) and sixty bars (60 bar), including all sub-ranges, and more particularly, may be around fifty seven bars (57 bar). In various implementations, the recharge pressure P3B may be equal to the recharge pressure P3B. For example, the recharge pressures P3A and P3B may be equal when only a single recharge cycle beginning at a start of a DFCO period is expected or desired during the DFCO period.

The hydraulic circuitry 306 includes a pump circuit 320 and an accumulator circuit 322. The pump circuit 320 connects the outlet line 312 to the supply lines 294 and the accumulator circuit 322 circuit via circuit lines 330 and 332, respectively. The pump circuit 320 includes parallel circuit lines 340, 342, a circuit line 344, a pressure side filter 346, and a filter bypass valve 348, and a check valve 350. The circuit lines 340, 342 connect the outlet line 312 and the circuit line 344. The circuit line 344 connects the circuit lines 340, 342 and the circuit lines 330, 332. The filter 346 is disposed in the circuit line 340 and filters fluid supplied by the pump 300. The filter bypass valve 348 is disposed in parallel with the filter 346 in the circuit line 342. The filter bypass valve 348 is a spring-loaded check valve that allows fluid to flow from the outlet line 312 to flow in a first direction and bypass the filter 346 when a pressure at an inlet of the filter bypass valve 348 is greater than a predetermined pressure. The filter bypass valve 348 inhibits the flow of fluid through the circuit line 342 in a second direction from the circuit line 344 to the outlet line 312. The check valve 350 is disposed in the circuit line 344 and allows fluid to flow from the circuit lines 340, 342 to the circuit lines 330, 332 in a first direction, and inhibits fluid flow in a second direction opposite the first direction.

The accumulator circuit 322 connects the accumulator 304 to the pressure circuit 320 and the supply lines 294. The accumulator circuit 322 includes circuit lines 360, 362, 364, an accumulator bypass valve 366, a check valve 368, and a line blow-off valve 370. The circuit line 360 connects the accumulator 304 to the circuit line 332. The circuit line 362 connects the accumulator 304 to the circuit line 330 and is connected to the circuit line 360 at a location downstream of the accumulator bypass valve 366. The circuit line 364 connects the accumulator 304 to the sump 290. The circuit line 364 is connected to the circuit line 360 and the circuit line 362 downstream of the accumulator bypass valve 366 and the check valve 368, respectively.

The accumulator bypass valve 366 is a two-way valve biased in a closed position and piloted by upstream pressure in the circuit line 360. The accumulator bypass valve 366 moves from the closed position to an open position when the upstream pressure is greater than a predetermined pressure. The check valve 368 is disposed in the circuit line 362 and allows fluid to flow from the accumulator 304 to the circuit line 330 in a first direction and inhibits fluid flow in a second direction opposite the first direction. The line blow-off valve 370 is a spring-loaded check valve disposed in the circuit line 364 between the accumulator 304 and the sump 290. The line blow-off valve 370 limits pressures within the hydraulic actuation system 212 to pressures below a pressure at which damage to one or more components would occur. The line blow-off valve 370 allows fluid to flow from the accumulator 304 to the sump 290 when a pressure at an inlet to the line blow-off valve 370 is greater than a predetermined pressure. The pressure sensor 308 senses a working pressure of the accumulator 304 (WPmeas) and is disposed within the circuit line 364. The pressure sensor 308 generates a pressure signal 372 indicative of the working pressure (WPmeas).

In operation, pressurized fluid is supplied to the supply lines 294 by the pump 300 and/or the accumulator 304. During periods when the pump 300 is operated, the pump 300 supplies pressurized fluid to the supply lines 294 via the pressure circuit 320 and, more particularly, through the circuit line 330. During accumulator recharging periods, the pump 300 supplies pressurized fluid to the accumulator 304 via the pressure circuit 320 and the accumulator circuit 322 and, more particularly, through the circuit lines 332 and 360. The accumulator 304 supplies pressurized fluid to the supply lines 294 via the accumulator circuit 322 and the pressure circuit 320 and, more particularly, through the circuit lines 362 and 330, when the pressure within the supply lines 294 is less than the working pressure of the accumulator 304.

The TCM 204 controls operation of the transmission 202 by controlling various transmission operating parameters including, but not limited to, fluid actuation pressure and flow, and pump duty cycle. The TCM 204 controls operation by controlling operation of various components of the transmission 202 including the pressure control and flow control solenoids of the clutch control subsystem 282 and the gear selection subsystem 284, and the pump 300 and the motor 302 of the oil delivery subsystem 286. The pump control module 206 that controls the working pressure of the accumulator 304 in cooperation with the DFCO module 178. More specifically, when the DFCO module 178 initiates a DFCO period, the pump control module 206 increases the working pressure in response to a start of the DFCO period. The pump control module 206 controls the working pressure by selectively powering the motor 302.

Figure 6:
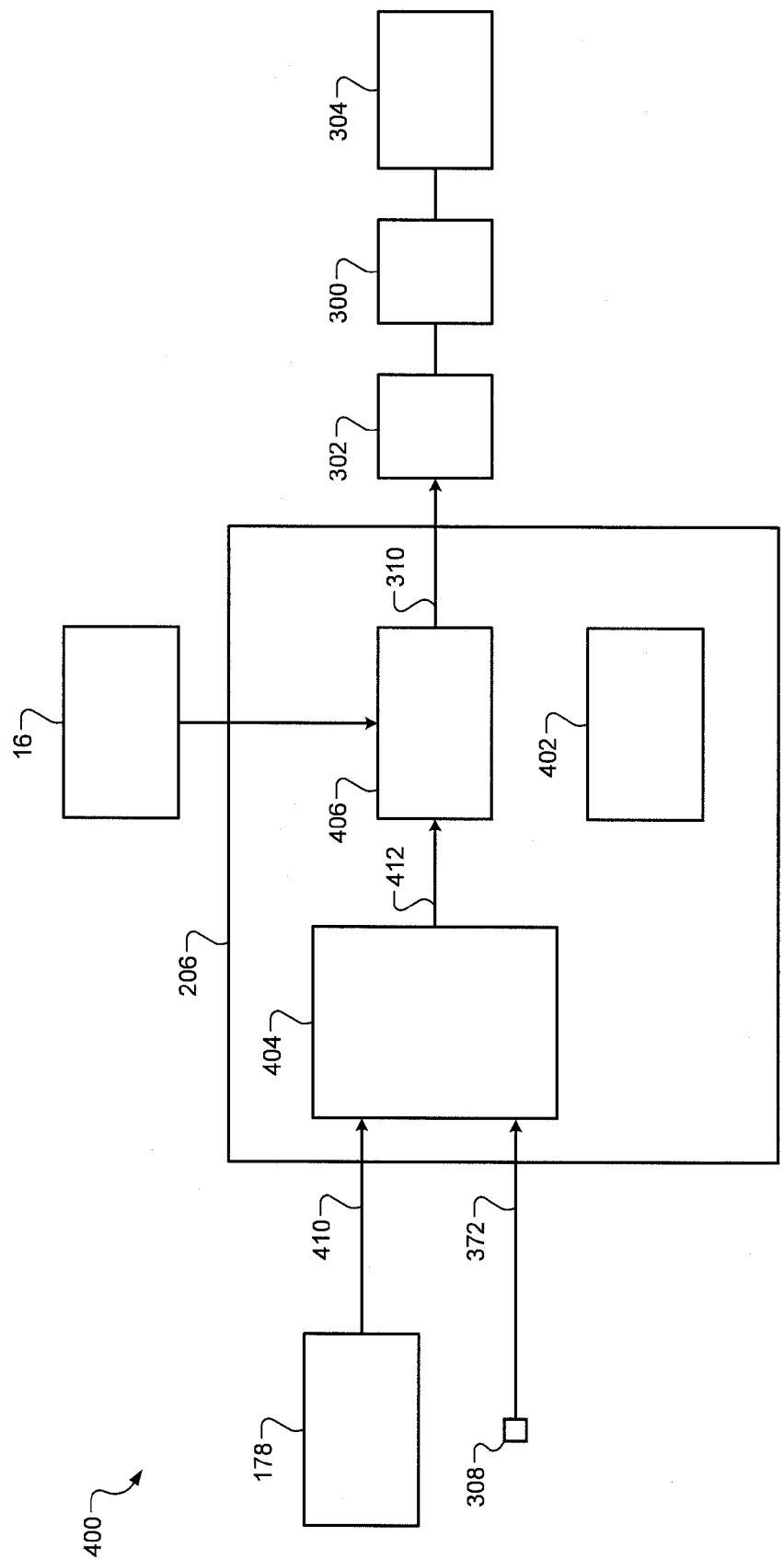
FIG. 6 is a functional block diagram illustrating an exemplary pump control module in an accumulator control system according to the present disclosure.

With particular reference to FIG. 6, a functional block diagram illustrates an exemplary implementation of the pump control module 206 in an accumulator control system 400 according to the present disclosure. The pump control module 206 includes a memory module 402, an accumulator module 404, and an actuator module 406. The memory module 402 includes non-volatile memory where various control parameters are stored for retrieval by various other modules. The accumulator module 404 receives the pressure signal 372 from the pressure sensor 308 and a DFCO signal 410 from the DFCO module 178. The DFCO signal 410 communicates a start and an end of a DFCO period and is indicative of whether a DFCO period is occurring. The accumulator module 404 monitors the pressure signal 372 and the DFCO signal 410 and generates a motor command signal 412 based on the signals received. The motor command signal 412 includes commands to turn the motor 302 on, and commands to turn the motor 302 off.

During periods other than DFCO periods, the accumulator module 404 monitors the pressure signal 372 and commands the motor 302 on and off to maintain the measured working pressure WPmeas between the recharge pressure P3A and the maximum system pressure P4. The accumulator module 404 commands the actuator module 406 to turn the motor 302 on when the measured working pressure WPmeas is less than the recharge pressure P3A. The accumulator module 404 commands the actuator module 406 to turn the motor 302 off when the measured working pressure WPmeas is greater than the maximum system pressure P4. In various implementations, the recharge pressure P3A and the maximum system pressure P4 may be retrieved from the memory module 402 by the accumulator module 404.

In response to a start of a DFCO period, the accumulator module 404 commands the actuator module 406 to turn the motor 302 on, which increases the working pressure of the accumulator 304. After commanding the motor 302 on, the accumulator module 404 monitors the pressure signal 372 and commands the motor 302 on and off to maintain the measured working pressure WPmeas between the recharge pressure P3B and the maximum system pressure P4. More specifically, after commanding the motor 302 on at the start of the DFCO period, the accumulator module 404 subsequently commands the actuator module 406 to turn the motor 302 off when the measured working pressure WPmeas is greater than the maximum system pressure P4. After commanding the motor 302 off, the accumulator module 404 continues to monitor the pressure signal 372 during the DFCO period and when the working pressure WPmeas is less than the recharge pressure P3B, the accumulator module 404 commands the actuator module 406 to turn the motor 302 on again. By maintaining the working pressure greater than P3B during DFCO periods, the accumulator module 404 increases the working pressures of the accumulator 304 during DFCO periods, and may reduce a number of recharging cycles during other periods. In various implementations, the accumulator module 404 may increase the working pressure of the accumulator 304 while the vehicle brakes are applied.

The actuator module 406 receives power from the electrical system 16. The actuator module 406 further receives the motor command signal 412 and selectively transmits power to the motor 302 in the signal 310 and thereby operates the pump 300 based on the motor command signal 412. The actuator module 406 supplies power to the motor 302 when the motor command signal 412 commands the motor 302 on and inhibits power to the motor 302 when the motor command signal 412 commands the motor 302 off.

Figure 7:
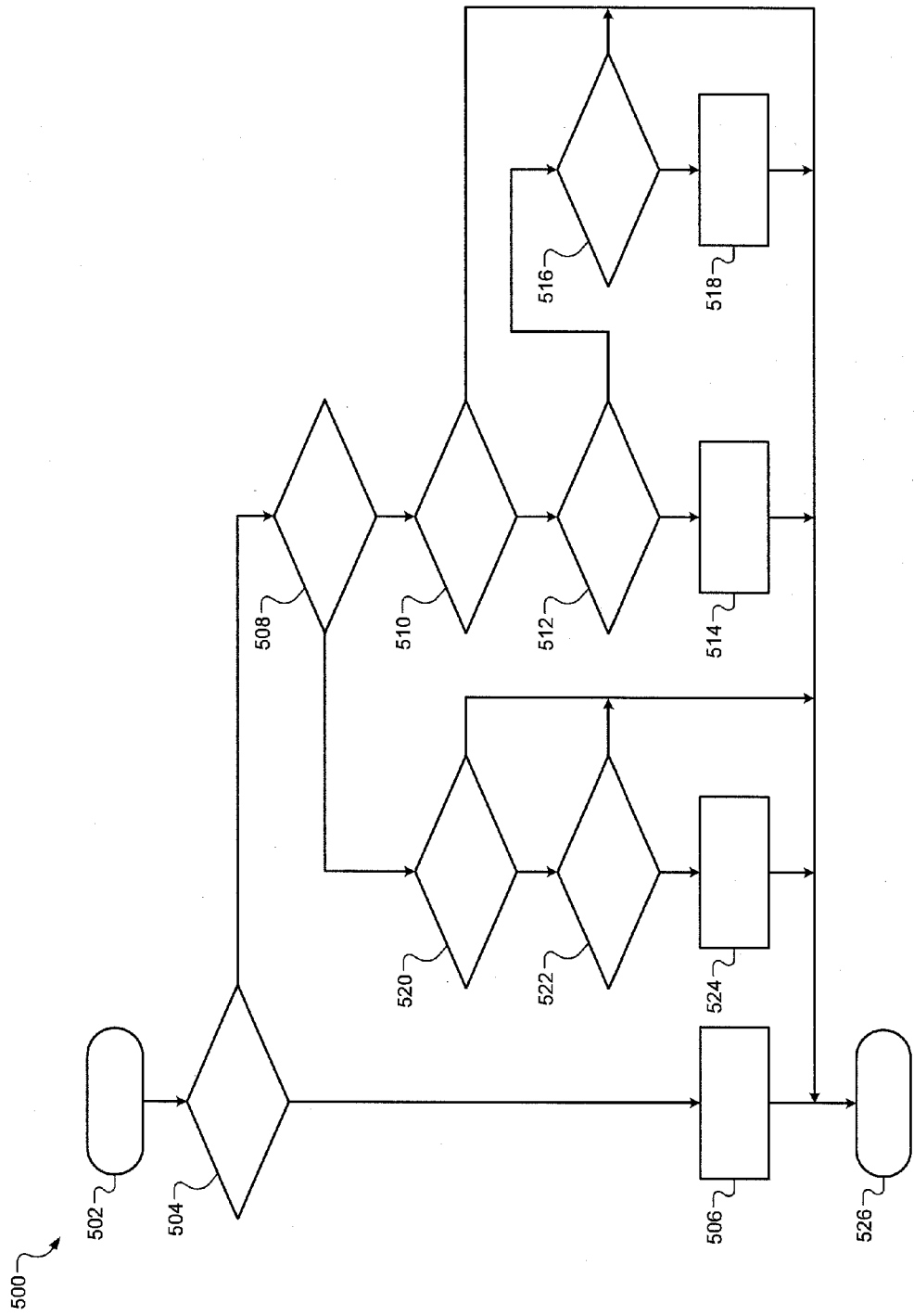
FIG. 7 is a flow diagram illustrating an exemplary method for controlling an oil delivery system of a transmission according to the present disclosure.

With particular reference to FIG. 7, a flow diagram illustrates an exemplary method 500 for controlling an oil delivery system of a transmission according to the present disclosure. The method 500 includes control of the operation of a transmission pump used to charge a transmission accumulator used in cooperation with the pump to supply pressurized fluid to transmission control mechanisms such as hydraulic actuators for clutches and synchronizers. More specifically, the method includes control of the operation of a prime mover used to drive operation of the pump. The prime mover may be an electrical motor, or other source of rotary power coupled to the vehicle. The method 500 can be implemented in one or more modules of a vehicle system such as the vehicle system 10 discussed above. Accordingly, for exemplary purposes, the method 500 will be described with reference to various components of the vehicle system 10. In this way, operation of the vehicle system 10 and, more particularly, the accumulator control system 400 may be more fully described and understood. Control according to the method 500 may proceed in a periodic manner every predetermined control period as described in more detail below.

A start of the method 500 and a control period is designated at 502. At 504, control determines whether the measured working pressure WPmeas of the accumulator 304 is greater than the maximum system pressure P4. If yes, then control proceeds at 506, otherwise control proceeds at 508. At 506, control discontinues operation of the pump 300 by turning off the motor 302. At 508, control determines whether a DFCO period has begun. If yes, then control proceeds at 510, otherwise control proceeds at 520.

At 510, control determines whether the pump 300 is not operating by determining whether the motor 302 is off. If the motor 302 is off, then control proceeds at 512, otherwise, control proceeds at 526. At 512, control determines whether a first recharge cycle has not completed since the DFCO period determined at 508 began. In other words, control determines whether the motor 302 was previously turned on at 514 in response to a start of the DFCO period and has subsequently turned off at 506. If a first recharge cycle has not completed, then control continues at 514, otherwise, control continues at 516. At 514 control begins (or continues) a first recharge cycle by turning (or maintaining) the motor 302 on to operate the pump 300. From 514, control continues at 526 to begin another control loop of the method 500.

At 516, when a first recharge cycle has completed, control determines whether the measured working pressure WPmeas of the accumulator 304 is less than the recharge pressure P3B. If yes, then control proceeds at 518, otherwise, control proceeds at 526. At 518, control turns the motor 302 on to operate the pump 300 and thereby begin another recharge cycle. From 518, control continues at 526 to begin another control loop of the method 500.

At 520, control determines whether the pump 300 is not operating by determining whether the motor 302 is off. If the motor 302 is off, then control proceeds at 522, otherwise, control proceeds at 526 to begin another control loop of the method 500. At 522, control determines whether the measured working pressure WPmeas is less than the recharge pressure P3A. If yes, then control continues at 524, otherwise, control continues at 526 to begin another control loop of the method 500. At 524, control turns the motor 302 on to operate the pump 300 and thereby begin another recharge cycle. At 526, control returns to the start at 502 to begin another control loop of the method 526.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a transmission of a vehicle including an engine, comprising:
   a deceleration fuel cutoff module that initiates a deceleration fuel cutoff period of engine operation; and
   an accumulator module that increases a working pressure of a transmission accumulator in response to a start of said deceleration fuel cutoff period.

2. The control system of claim 1, wherein said accumulator module operates a pump used to charge said transmission accumulator in response to said start of said deceleration fuel cutoff period.

3. The control system of claim 2, wherein said pump is powered via torque supplied by one of said engine and said transmission.

4. The control system of claim 2, wherein said accumulator module operates an electric motor that powers said pump.

5. The control system of claim 1, wherein:
   said accumulator module charges said transmission accumulator by operating a pump when said working pressure is less than a recharge pressure; and
   said accumulator module adjusts said recharge pressure between a first pressure during periods other than said deceleration fuel cutoff period to a second pressure greater than said first pressure during said deceleration fuel cutoff period.

6. The control system of claim 5, wherein said accumulator module increases said recharge pressure based on a measured working pressure at said start of said deceleration fuel cutoff period.

7. The control system of claim 1, wherein said transmission accumulator supplies pressurized fluid to an actuator controlling one of a clutch and a gear synchronizer.

8. The control system of claim 1, wherein said accumulator module increases said working pressure while a vehicle brake is applied.

9. The control system of claim 1, wherein said transmission is a dual-clutch transmission.

10. The control system of claim 1, wherein said transmission accumulator is a hydro-pneumatic accumulator.

11. A method for controlling a transmission of a vehicle including an engine, comprising:
    initiating a deceleration fuel cutoff period of engine operation; and
    increasing a working pressure of a transmission accumulator in response to a start of said deceleration fuel cutoff period.

12. A method for controlling a transmission of a vehicle including an engine, comprising:
    initiating a deceleration fuel cutoff period of engine operation;
    increasing a working pressure of a transmission accumulator in response to a start of said deceleration fuel cutoff period; and
    operating a pump used to charge said transmission accumulator in response to said start of said deceleration fuel cutoff period.

13. The method of claim 12, further comprising powering said pump via torque supplied by one of said engine and said transmission.

14. The method of claim 12, further comprising operating an electric motor that powers said pump.

15. The method of claim 11, further comprising:
    charging said transmission accumulator by operating a pump when said working pressure is less than a recharge pressure; and
    adjusting said recharge pressure between a first pressure during periods other than said deceleration fuel cutoff period to a second pressure greater than said first pressure during said deceleration fuel cutoff period.

16. The method of claim 15, further comprising increasing said recharge pressure based on a measured working pressure at said start of said deceleration fuel cutoff period.

17. The method of claim 11, wherein said transmission accumulator supplies pressurized fluid to an actuator controlling one of a clutch and a gear synchronizer.

18. The method of claim 11, further comprising increasing said working pressure while a vehicle brake is applied.

19. The method of claim 11, wherein said transmission is a dual-clutch transmission.

20. The method of claim 11, wherein said transmission accumulator is a hydro-pneumatic accumulator.

* * * * *